United States Patent
Fujii et al.

(10) Patent No.: US 10,788,833 B2
(45) Date of Patent: Sep. 29, 2020

(54) TRANSPORT SYSTEM

(71) Applicant: Hitachi Industrial Products, Ltd., Chiyoda-ku, Tokyo (JP)

(72) Inventors: Manabu Fujii, Tokyo (JP); Tsutomu Ito, Tokyo (JP); Daisuke Noguchi, Tokyo (JP); Jingpeng Xu, Tokyo (JP); Kunihiko Aoki, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 0 days.

(21) Appl. No.: 15/763,063

(22) PCT Filed: Jan. 24, 2017

(86) PCT No.: PCT/JP2017/002258
§ 371 (c)(1),
(2) Date: Mar. 23, 2018

(87) PCT Pub. No.: WO2017/135098
PCT Pub. Date: Aug. 10, 2017

(65) Prior Publication Data
US 2018/0275664 A1    Sep. 27, 2018

(30) Foreign Application Priority Data
Feb. 2, 2016 (JP) .................... 2016-017648

(51) Int. Cl.
*B65G 43/00* (2006.01)
*G05D 1/02* (2020.01)
(Continued)

(52) U.S. Cl.
CPC ....... *G05D 1/0214* (2013.01); *B60K 31/0058* (2013.01); *B65G 43/00* (2013.01);
(Continued)

(58) Field of Classification Search
CPC ............. B60K 31/0058; G05D 1/0231; G05D 1/0225; G05D 1/0214; G05D 1/0027;
(Continued)

(56) References Cited

U.S. PATENT DOCUMENTS 5,023,790 A * 6/1991 Luke, Jr. .......... G05B 19/41865
180/168
7,127,931 B1 * 10/2006 Borders .................. B21D 37/14
72/404
(Continued)

FOREIGN PATENT DOCUMENTS

JP  2008-98408 A   4/2008
JP  2009-123156 A  6/2009
(Continued)

OTHER PUBLICATIONS

International Search Report (PCT/ISA/210) issued in PCT Application No. PCT/JP2017/002258 dated Apr. 4, 2017 with English-language translation (five (5) pages).
(Continued)

*Primary Examiner* — Steve Clemmons
(74) *Attorney, Agent, or Firm* — Crowell & Moring LLP

(57) ABSTRACT

Provided is a transport system in which a worker performs maintenance work on a shelf in a maintenance area within a warehouse in which a vehicle area where a transport vehicle travels and the maintenance area where the worker performs the maintenance work are formed separately. A safety device permits an entry of the worker into the maintenance area after the transport vehicle transporting the shelf takes the shelf down within the maintenance area in accordance with a travel instruction from a service device and then the transport vehicle within the maintenance area exits to the vehicle area.

10 Claims, 12 Drawing Sheets

(51) Int. Cl.
  *B60K 31/00* (2006.01)
  *B65G 1/137* (2006.01)
  *G05B 19/418* (2006.01)

(52) U.S. Cl.
  CPC ......... *G05D 1/0231* (2013.01); *B65G 1/1373* (2013.01); *B65G 1/1378* (2013.01); *B65G 2201/02* (2013.01); *G05B 19/41895* (2013.01); *Y10S 901/01* (2013.01); *Y10S 901/02* (2013.01)

(58) Field of Classification Search
  CPC ............ G05D 2201/0216; B65G 43/00; B65G 43/02; B65G 1/1373; B65G 1/1378; B65G 2201/02; G05B 19/41895; B65H 2407/10; B65H 2407/33; F16P 3/08; F16P 3/12; F16P 3/14; F16P 3/144
  See application file for complete search history.

(56) References Cited

U.S. PATENT DOCUMENTS

| | | | | |
|---|---|---|---|---|
| 7,840,430 | B2 * | 11/2010 | Nakamura | G06Q 10/063 705/7.11 |
| 7,888,825 | B2 * | 2/2011 | Iida | B25J 19/06 307/326 |
| 7,894,932 | B2 * | 2/2011 | Mountz | G06Q 10/087 700/214 |
| 7,932,809 | B2 * | 4/2011 | Nair | G07C 9/00111 235/375 |
| 8,280,547 | B2 * | 10/2012 | D'Andrea | B66F 9/063 700/214 |
| 8,339,260 | B2 * | 12/2012 | Krieger | B65H 26/00 250/216 |
| 8,983,647 | B1 * | 3/2015 | Dwarakanath | G06Q 10/087 700/216 |
| 8,989,900 | B2 * | 3/2015 | Nakamura | B25J 19/06 166/250.01 |
| 9,087,314 | B2 * | 7/2015 | Hoffman | G06Q 10/087 |
| 9,280,153 | B1 * | 3/2016 | Palamarchuk | G05D 1/00 |
| 9,429,930 | B2 * | 8/2016 | Winkler | B65G 1/1378 |
| 9,519,284 | B2 * | 12/2016 | Wurman | G05B 19/4189 |
| 9,740,212 | B2 * | 8/2017 | D'Andrea | G05B 19/41895 |
| 9,927,797 | B2 * | 3/2018 | Stubbs | B25J 5/00 |
| 2009/0289791 | A1 * | 11/2009 | Onishi | B25J 9/1676 340/555 |
| 2011/0298579 | A1 * | 12/2011 | Hardegger | F16P 3/14 340/3.1 |
| 2016/0229631 | A1 * | 8/2016 | Kimura | G05D 1/0291 |
| 2016/0246301 | A1 | 8/2016 | Kazama et al. | |
| 2016/0355338 | A1 | 12/2016 | Kazama et al. | |
| 2018/0170720 | A1 * | 6/2018 | Mannari | B66C 13/48 |

FOREIGN PATENT DOCUMENTS

| | | |
|---|---|---|
| JP | 2009-241758 A | 10/2009 |
| JP | 2009241758 A * | 10/2009 |
| JP | 2010-58890 A | 3/2010 |
| WO | WO 2015/052830 A1 | 4/2015 |
| WO | WO 2015/097736 A1 | 7/2015 |
| WO | WO 2015/125217 A1 | 8/2015 |

OTHER PUBLICATIONS

Japanese-language Written Opinion (PCT/ISA/237) issued in PCT Application No. PCT/JP2017/002258 dated Apr. 4, 2017 (three (3) pages).

* cited by examiner

TRANSPORT SYSTEM

INCORPORATION BY REFERENCE

The present application claims priority of prior Japanese Patent Application No. 2016-17648, filed on Feb. 2, 2016, the content of which is incorporated herein by reference.

TECHNICAL FIELD

The present invention relates to a transport system.

BACKGROUND ART

A transport system has been proposed which allows an unattended transport vehicle for item transportation to travel according to a received travel instruction. For maintenance of the unattended transport vehicle, the unattended transport vehicle needs to be withdrawn from a vehicle area to a maintenance area.

Given the circumstances, Patent Literature 1 describes an input/withdrawal device for an overhead transport vehicle, which allows an unattended transport vehicle traveling on a travel rail installed along a ceiling to be inputted to and withdrawn from the travel rail. Automatic input and withdrawal of the transport vehicle can make the input/withdrawal time shorter.

CITATION LIST

Patent Literature

Patent Literature 1: Japanese Patent Application Publication No. 2008-98408

SUMMARY OF INVENTION

Technical Problem

In a vehicle area in a warehouse, multiple unattended transport vehicles travel while transport targets such as racks to be transported by the unattended transport vehicles are arranged here and there. If all other unattended transport vehicles are stopped in order to withdraw one of the racks from the vehicle area, collision between the unattended transport vehicles and a worker entering an unattended vehicle travel area (the vehicle area) for the withdrawal may be prevented. However, if all the unattended transport vehicles stop traveling, the entire transport work stops and thus the work efficiency is decreased.

In the system in which each unattended transport vehicle travels along the travel rail as described in Patent Literature 1, only a specific unattended transport vehicle can be easily withdrawn by switching one travel rail to a withdrawal rail. However, with a layout in which no physical travel rail is installed and the unattended transport vehicles can travel freely on the passages in the warehouse, it is difficult to safely withdraw only a withdrawal target, such as a rack, without stopping the other unattended transport vehicles.

Thus, a main object of the present invention is, in a transport system in which multiple transport vehicles travel on passages, to allow a transport target or a transport vehicle to be withdrawn or inputted without stopping another transport vehicle.

Solution to Problem

To solve the above problems, the present invention provides a transport system in which a transport vehicle (3) moves a transport target (3Z) within a vehicle area (V20) in a warehouse provided with the vehicle area (V20) where the transport vehicle (3) travels, a maintenance area (H12) where a worker performs maintenance work, and a worker area (H11) where the worker moves, the transport system including:

a light curtain (41) that limits movement of the transport vehicle (3) between the vehicle area (V20) and the maintenance area (H12); and a door (45) that limits movement of the worker to the maintenance area (H12), in which after the transport target (3Z) moves to the maintenance area (H12), the door (45) is unlocked while the light curtain (41) limits the movement of the transport vehicle (3).

To solve the above problems, the present invention provides a transport system in which a transport vehicle (3) moves a transport target (3Z) within a vehicle area (V20) in a warehouse provided with the vehicle area (V20) where the transport vehicle (3) travels, a maintenance area (H12) where a worker performs maintenance work, and a worker area (H11) where the worker moves, the transport system including:

a light curtain (41) that limits movement of the transport vehicle (3) between the vehicle area (V20) and the maintenance area (H12); and a door (45) that limits movement of the transport vehicle (3) to the worker area (H11), in which after the transport vehicle (3) moves to the maintenance area (H12), the door (45) is unlocked to allow the transport vehicle (3) to move to the worker area (H12) while the light curtain (41) limits the movement of the transport vehicle (3).

To solve the above problems, the present invention provides a transport system in which a transport vehicle (3) moves a transport target (3Z) within a vehicle area (V20) in a warehouse provided with the vehicle area (V20) where the transport vehicle (3) travels, a maintenance area (H12) where a worker performs maintenance work, and a worker area (H11) where the worker moves, the transport system including:

a light curtain (41) that limits movement of the transport vehicle (3) between the vehicle area (V20) and the maintenance area (H12); and a door (45) that limits movement of the transport target (3Z) to the maintenance area (H12), in which the door (45) is unlocked to allow the transport target (3Z) to move from the worker area (H11) to the maintenance area (H12) while the light curtain (41) limits the movement of the transport vehicle (3).

To solve the above problems, the present invention provides a transport system in which a worker performs maintenance work on a transport target (3Z) transported by a transport vehicle (3) or the transport vehicle (3) in a warehouse provided with the vehicle area (V20) as a place where the transport vehicle (3) travels, a maintenance area (H12) as a place where the worker performs maintenance work, and a worker area (H11) as a place where the worker moves, in which the maintenance area is formed to protrude outward from the vehicle area in a straight line.

Advantageous Effects of Invention

According to the present invention, in a transport system in which multiple transport vehicles travel on passages, withdrawal and input of a transport target or a transport vehicle can be performed without stopping another transport vehicle.

DESCRIPTION OF EMBODIMENTS

Hereinafter, embodiments of the present invention will be described with reference to the accompanying drawings.

Figure 1A:
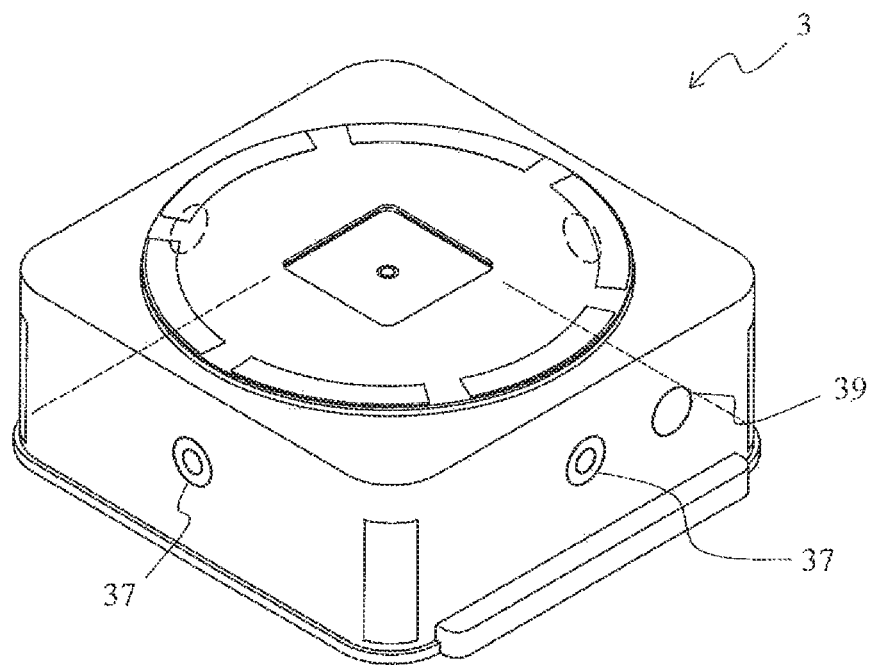
FIG. 1A illustrates a transport vehicle.

FIG. 1A illustrates a transport vehicle 3.

The transport vehicle 3 is an unattended automatic travel vehicle that travels with rolling wheels on the bottom thereof (not illustrated). A collision detection unit 37 of the transport vehicle 3 uses a detector to detect an obstacle before collision. As an example for implementing this detector, there is illustrated a method of detecting an obstacle before collision by transmitting a detection signal such as light (an infrared ray, ultrasound, and the like) and obtaining information on the change of the distance to the surrounding obstacle.

An infrared communication unit 39 of the transport vehicle 3 is a communication means for establishing infrared communication between the transport vehicle 3 and a surrounding facility such as a charging station.

Figure 1B:
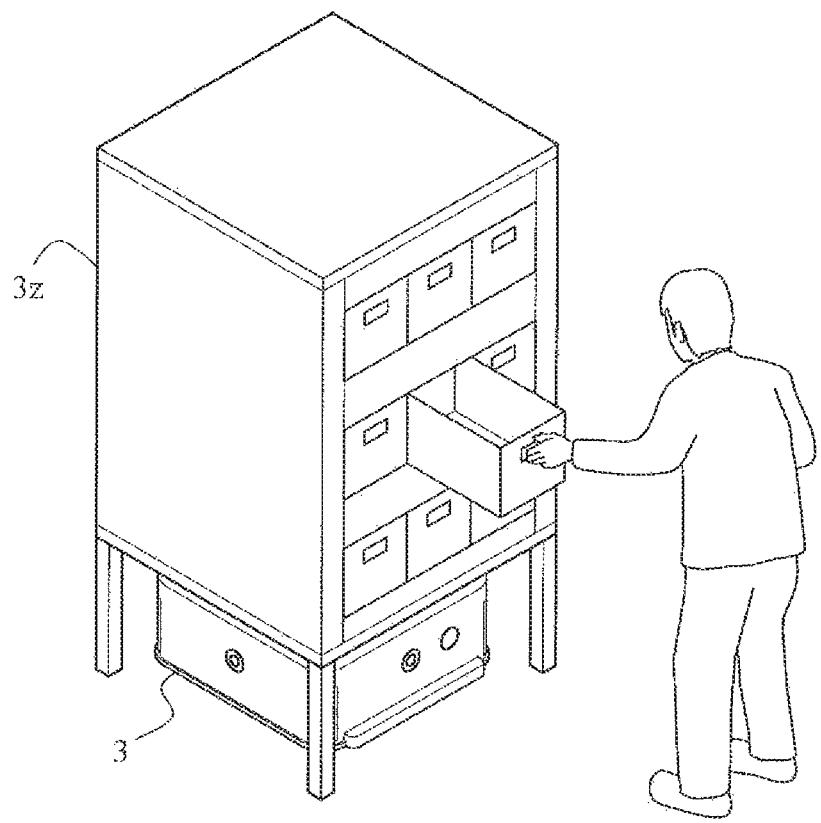
FIG. 1B illustrates appearance of a rack transported by the transport vehicle.

FIG. 1B illustrates appearance of a rack 3z as an example of a transport target transported by the transport vehicle 3. The transport vehicle 3 goes under the bottom of the rack 3z, and then a top part 32 of the transport vehicle 3 rises and pushes out the bottom of the rack 3z to lift and transport the rack 3z. With this, because the transport vehicle 3 transporting the rack 3z comes around a worker, the worker does not need to come close to the rack 3z from himself, and thus the worker can pick an item efficiently from the rack 3z.

Figure 2A:
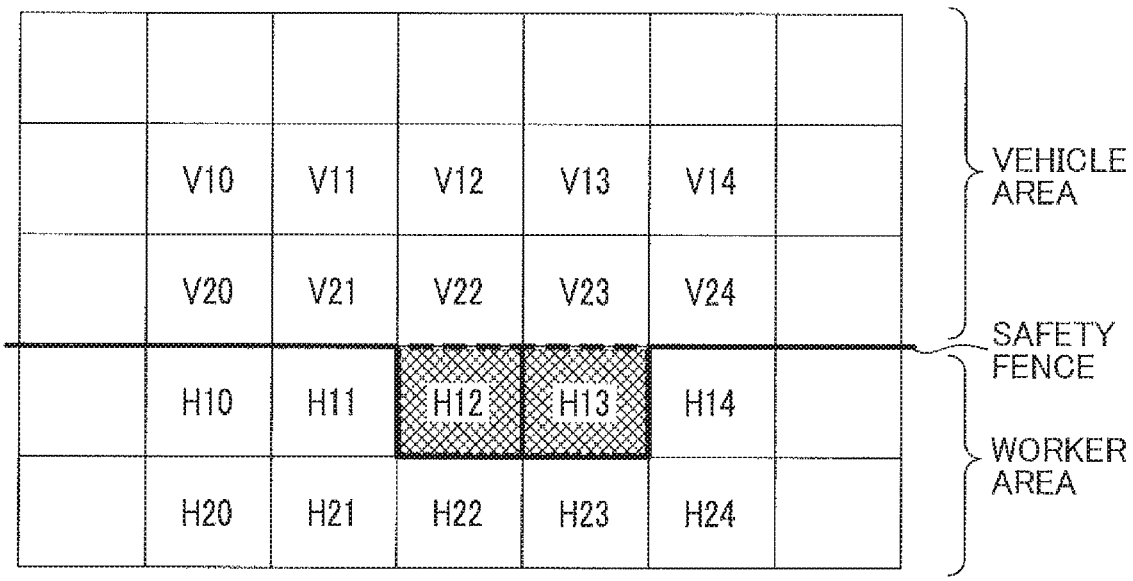
FIG. 2A is a plan view that illustrates areas in a warehouse.

FIG. 2A is a plan view that illustrates areas in a warehouse.

A layout inside the warehouse includes a vehicle area such as areas V10 to V24 and a worker area such as areas H10 to H24 partitioned by a safety fence. The transport vehicle 3 and the worker hardly collide because their activity ranges are separated such that the transport vehicle 3 travels in the vehicle area and the worker exists in the worker area. The transport vehicle 3 reads a tag such as a barcode on a floor of each area to obtain the current area where the host vehicle is.

Meanwhile, the worker needs to come close to a main body of the transport vehicle 3 or the rack transported by the transport vehicle 3 to do work such as maintenance. Thus, a maintenance area is provided in the areas H12 and H13 in the worker area adjacent to the vehicle area. For example, in FIG. 2A, since the safety fence is linearly arranged, the maintenance area is provided with a shape projecting outward from the vehicle area, or with a shape of the worker area partially concaved. This maintains a straight passage along V20 to V24 on the vehicle area side and thus the transport vehicle 3 can pass through from V20 to V24 without slowing down.

Accordingly, even when an item falls down from the rack 3z during the work in the maintenance area, the provision of the maintenance area as an area for performing maintenance can prevent the transport vehicle 3 and the worker from being distracted by the fallen item. The work in the maintenance area is not limited to the maintenance, and is general work performed by the worker in the maintenance area such as input of the transport vehicle 3, withdrawal of the transport vehicle 3, input of the rack 3z, withdrawal of the rack 3z, and replacement of an item in the rack 3z (partially or entirely).

The worker in the maintenance area can come close to the main body of the transport vehicle 3 stopping in the maintenance area or the rack taken down in the maintenance area to perform the maintenance. Although the maintenance area is provided in two places or the areas H12 and H13 in FIG. 2A, the maintenance area may be at least one place. Providing the maintenance area in two places allows the worker to withdraw an object to be maintained from one maintenance area while input another object to be maintained to the other maintenance area, simultaneously.

The object to be inputted to and withdrawn from the maintenance area is not only the main body of the transport vehicle 3 but also a storage jig (storage stand or the rack 3z) and a stored item (such as a product) stored in that storage jig. For example, when replacing all products in the rack 3z, the work efficiency is more improved if the worker is in the same area as the rack 3z to make the distance short.

In this case, either one of the transport vehicle 3 in operation with a powered-on motor and the worker for the maintenance can enter one maintenance area. In other words, the maintenance area is an area in which the transport vehicle 3 in operation and the worker can exist exclusively.

Meanwhile, a non-operating transport vehicle 3 with a powered-off motor and the worker may exist in the same maintenance area in the same time. This is for collecting the currently existing non-operating transport vehicle 3 from the vehicle area for maintenance and for inputting a new currently non-operating transport vehicle 3 to the vehicle area later.

In addition, the stopping transport vehicle 3 with the powered-on motor and the worker may exist in the same maintenance area in the same time.

Figure 2B:
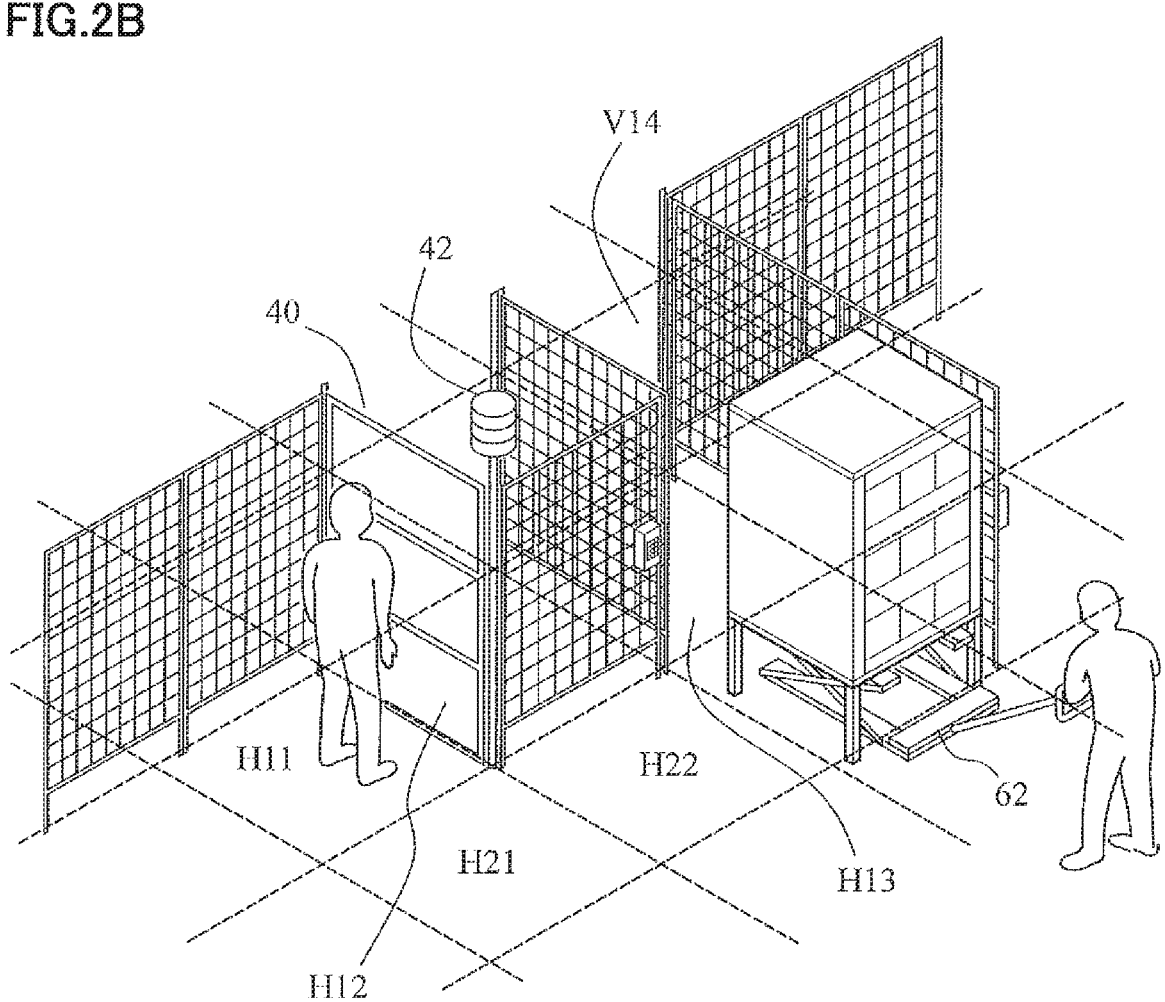
FIG. 2B is a diagram that illustrates the plan view of FIG. 2A in three dimensions.

FIG. 2B is a diagram that illustrates the plan view of FIG. 2A in three dimensions.

A picking gate 40 is provided between the areas H11 and H12, and the worker in the area H11 can do simple work (such as picking work) from outside the maintenance area on the object to be picked in the area H12 by sticking out the hand toward the area H12 side.

Thus, unlike other safety fences, the picking gate 40 is provided with clearances that allow the picked product to be passed through but not a whole human body to be passed through. On the other hand, the other safety fences do not allow a whole human body or even a human hand to be passed through. The worker can check an alert from light or sound from a signal tower 42 provided with the picking gate 40.

In addition, an electronic door 45 (see FIG. 8) is installed between the adjacent maintenance area H12 and the worker area H22 and between the adjacent maintenance area H13 and the worker area H23. This electronic door 45 is electronically controlled by a safety device 2 to open during only the time when the worker is permitted to enter the maintenance area. The worker in the worker area H23 in FIG. 2B uses a hand pallet 62 to take out the rack from the other side (the maintenance area H13) of the opened electronic door 45.

Figure 3A:
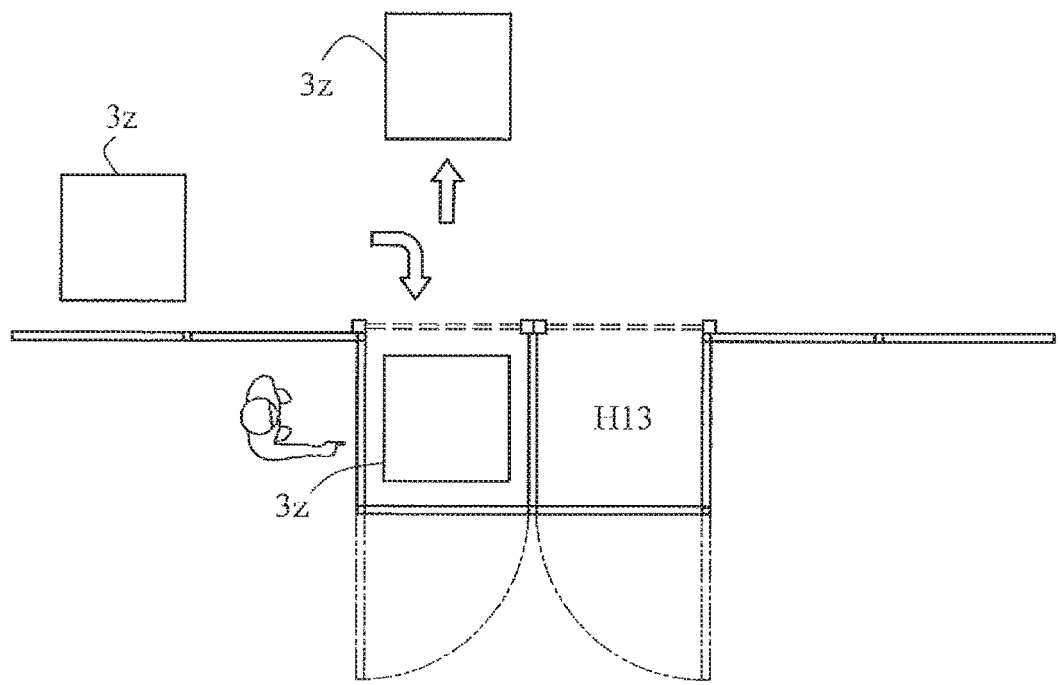
FIG. 3A is a plan view that illustrates an example of work performed around a maintenance area H12 in FIG. 2A.

FIG. 3A is a plan view that illustrates an example of work performed around the maintenance area H12 in FIG. 2A. The transport vehicle 3 for transporting the rack 3z enters the maintenance area H12 from the vehicle area V20. In the transport vehicle 3 stopping in the maintenance area H12, the motor s powered off according to a power-off signal (a deactivation signal) from the safety device 2. Thus, the worker in the worker area H11 can pick the item safely by reaching out the hand to the maintenance area H12.

Figure 3B:
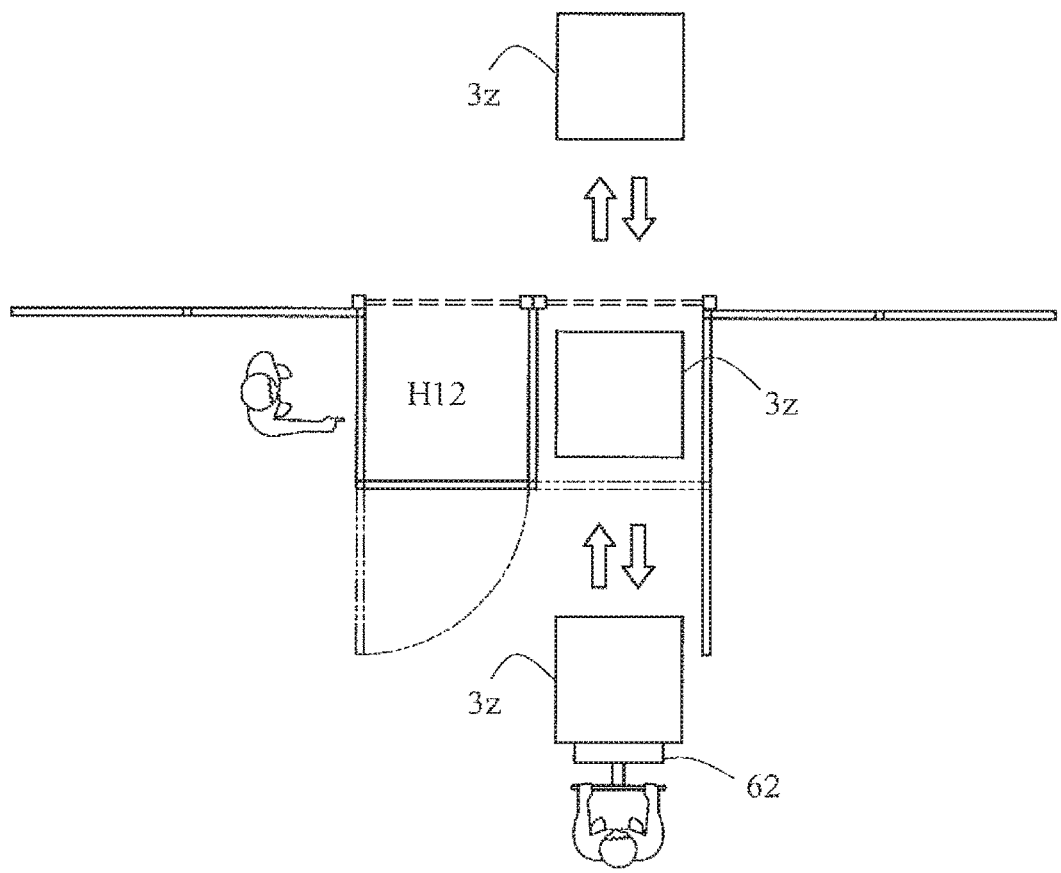
FIG. 3B is a plan view that illustrates an example of work performed around a maintenance area H13 in FIG. 2A.

FIG. 3B is a plan view that illustrates an example of work performed around the maintenance area H13 in FIG. 2A. The transport vehicle 3 for transporting the rack 3z enters the maintenance area H12 from the vehicle area V13. The transport vehicle 3 leaves the transported rack 3z in the maintenance area H12 and is withdrawn from the maintenance area H12. Thus, the worker in the worker area H11 can collect the rack 3z safely in the maintenance area H12 after the transport vehicle 3 exits.

Figure 4A:
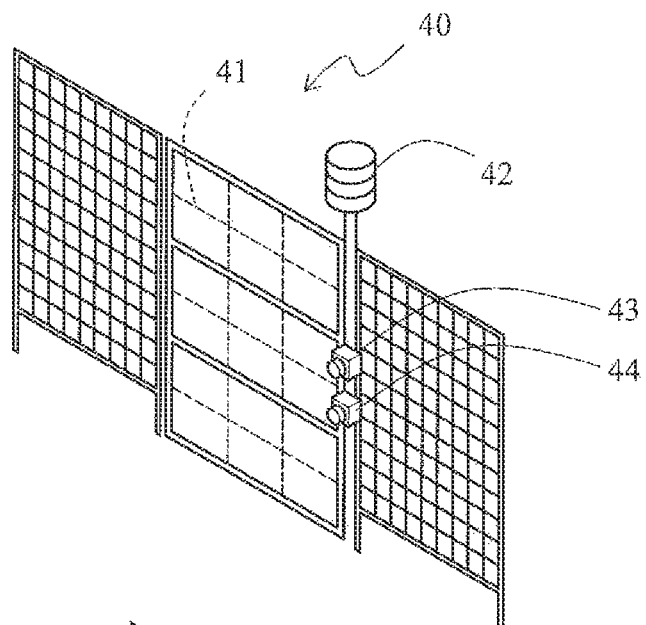
FIG. 4A illustrates an equipment set for worker provided on a picking gate.

FIG. 4A illustrates an equipment set for worker provided on the picking gate 40.

The picking gate 40 is provided with a light curtain 41, the signal tower 42, a stop button 43, and a recovery button 44.

The light curtain 41 is configured to scan the clearances of the picking gate 40 with a detection signal such as an infrared ray. When this detection signal is interrupted by the worker's hand or the item in the rack, the light curtain 41 detects that interruption as a dangerous action, such as protrusion of a body part of the worker.

As described in FIG. 2B, the signal tower 42 is a warning light to alert the worker.

The stop button 43 is a button for transmitting stop signals in the same time to all transport vehicles 3 in the vehicle area.

The recovery button 44 is a button for operating the light curtain 41 (or scanning the detection signal) again after the alarm is sounded because of the interruption in the light curtain 41.

Figure 4B:
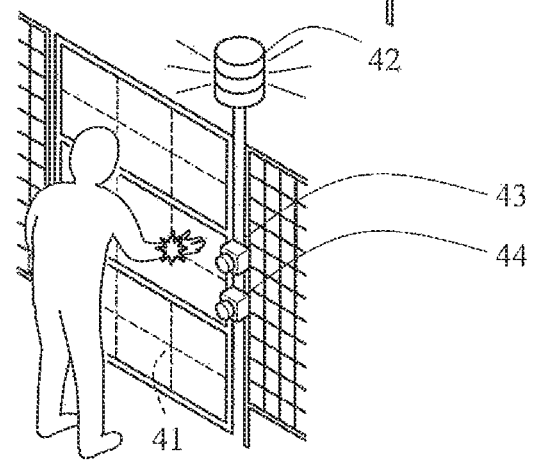
FIG. 4B illustrates operations of a light curtain.

FIG. 4B illustrates operations of the light curtain 41. When the worker reaches out the hand over the light curtain 41, the detection signal is interrupted and thus the signal tower 42 alerts the worker.

Once receiving the interruption of the detection signal of the light curtain 41 as an event, the safety device 2 transmits an emergency stop signal to the transport vehicle 3 going to enter the maintenance area or the transport vehicle 3 going to exit from the maintenance area via a wireless local area network (LAN) communication unit 28 and stops the transport vehicle 3.

In addition, when the detection signal is interrupted, the safety device 2 may instruct an operation device 1 to change (detour) the travel route of the transport vehicle 3 so as to prevent a new transport vehicle 3 from entering the maintenance area.

Figure 4C:
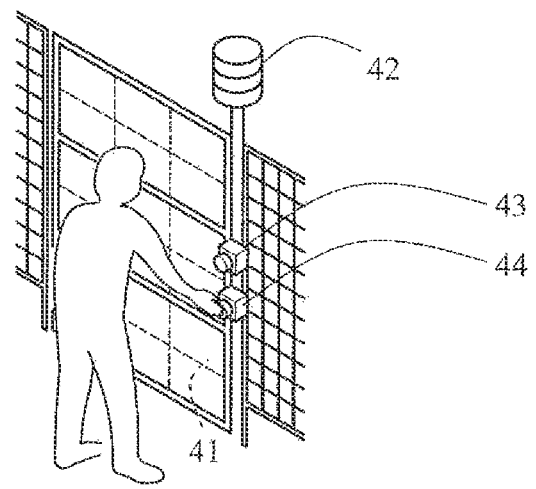
FIG. 4C illustrates operations of a recovery button.

FIG. 4C illustrates operations of the recovery button 44. When the worker presses the recovery button 44, the alarm of the signal tower 42 stops and the light curtain 41 operates again.

Figure 5:
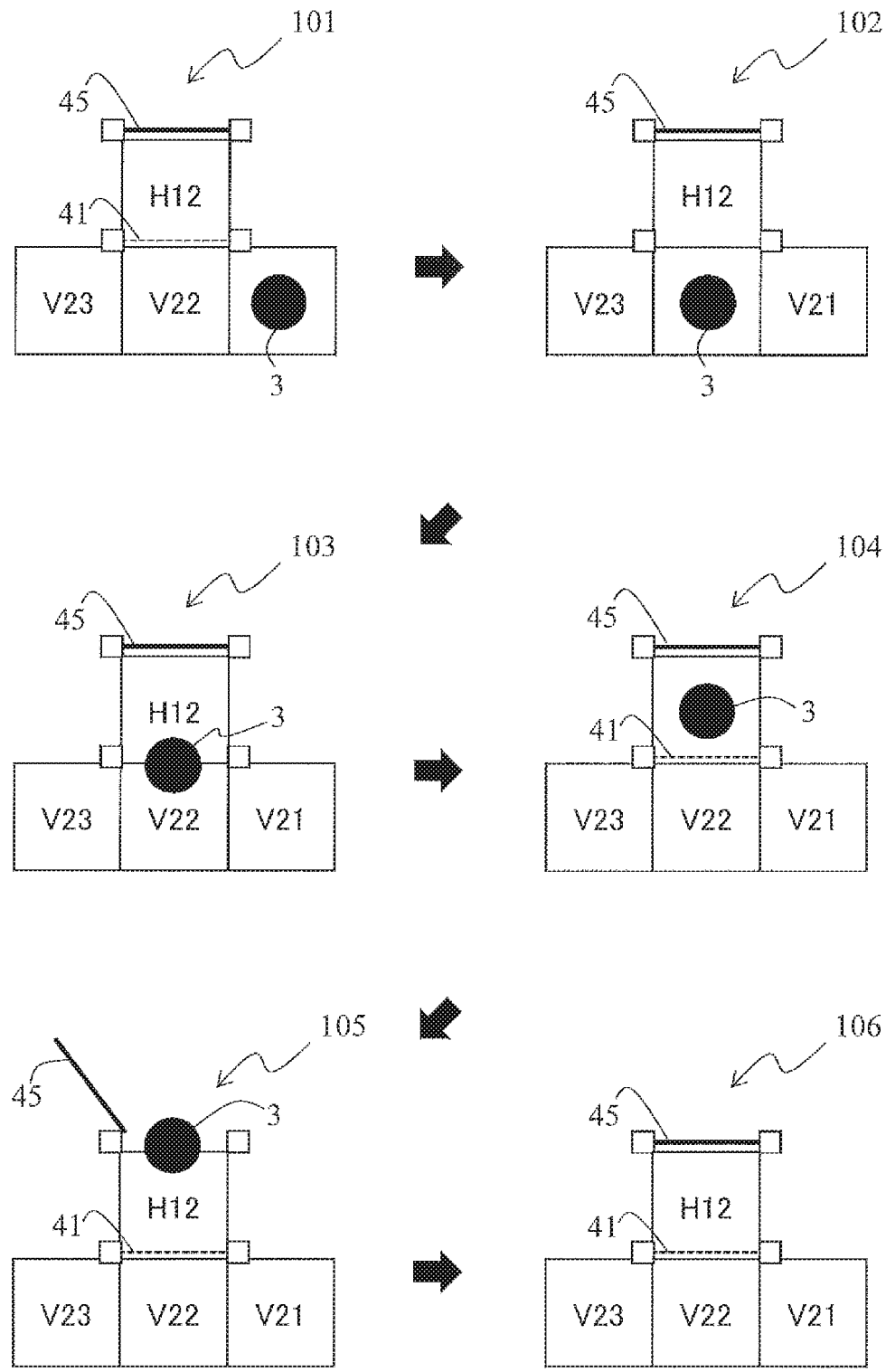
FIG. 5 illustrates work of collecting the transport vehicle in the maintenance area according to one embodiment of the present invention.

FIG. 5 illustrates work of collecting the transport vehicle 3 in the maintenance area.

In the maintenance area H12 in a reference sign 101, the light curtain 41 is provided on a boundary with the vehicle area (outside), and the electronic door 45 is provided on a boundary with the worker area (inside) as entry deterrent means. As described in FIG. 2B, this electronic door 45 is closed during the time when the worker is not permitted to enter the maintenance area.

Instead of providing the electronic door 45, the light curtain 41 may be provided on the position of the electronic door 45 to sound the alarm when the worker enters the maintenance area during the time when the entry is not permitted and the detection signal (infrared ray and the like) of the light curtain 41 contacts the worker's body.

In addition, management of entry of the worker may be stricter by using the electronic door 45 and the light curtain 41 in the same place.

In the initial state in the reference sign 101, these entry deterrent means are turned on to prevent accidental entry of the (unexpected) worker and transport vehicle 3 not permitted by the safety device 2 to enter the maintenance area, and thus the light curtain 41 keeps scanning by the detect on signal and the electronic door 45 is closed. Hereinafter, the description is started from a situation in which the transport vehicle 3 to be collected in the maintenance area is in V21.

The transport vehicle 3 located in V21 moves straight to V22 (reference sign 102). At this time, once the transport vehicle 3 obtains the permission to enter the maintenance area from the safety device 2, the light curtain 41 is turned off. The transport vehicle 3 then enters H12 from V22 (reference signs 103 and 104). After the first transport vehicle 3 enters the maintenance area, the light curtain 41 is turned on again so as to sound the alarm when a second transport vehicle 3 accidentally enters the maintenance area.

The safety device 2 checks that the transport vehicle 3 is in the maintenance area H12 (vehicle presence check) by emitting an infrared ray from a light source (not illustrated) located at a height, where the infrared ray is interrupted by the main body of the transport vehicle 3 (e.g. a half of the height of the transport vehicle 3), to the transport vehicle 3 in the maintenance area H12 and detecting whether the infrared ray is interrupted by the transport vehicle 3 using a sensor (not illustrated), for example.

At this time, during work, the safety device 2 transmits the signal for cutting off the power of the motor to the transport vehicle 3 to prevent the worker from accidentally instructing the transport vehicle 3 stopping in the maintenance area H12 to operate, via the operation device 1. As a result, the motor in the transport vehicle 3 does not drive even if the operation device 1 transmits the travel instruction to the transport vehicle 3. In addition, after checking the power-off of the transport vehicle 3, the safety device 2 opens the electronic door 45 and allows the worker to enter the maintenance area H12 (reference sign 105).

When the transport vehicle 3 is stopping, the processing for cutting off the power of the motor may be omitted.

The transport vehicle 3 is withdrawn from the maintenance area H12 with, for example, manual control via a remote controller operated by the worker. Likewise, the new transport vehicle 3 is inputted to the empty maintenance area H12 also with the manual control via the remote controller. Then, like the initial state in the reference sign 101, the safety device 2 turns on the two types of entry deterrent means again after the worker exits (reference sign 106).

The work of collecting the transport vehicle 3 in the maintenance area is described above in the order of the reference signs 101, 102, 103, 104, 105, and 106. Meanwhile, work of inputting the new transport vehicle 3 in the maintenance area is performed in the opposite order of the collection work. That is, the input work is performed in the order of the reference signs 106, 105, 104, 103, 102, and 101.

In the work of inputting the new transport vehicle 3, the processing for permitting exit of the transport vehicle 3 is performed in the state in the reference sign 104, and the processing for permitting entry of the transport vehicle 3 is not required.

Figure 6:
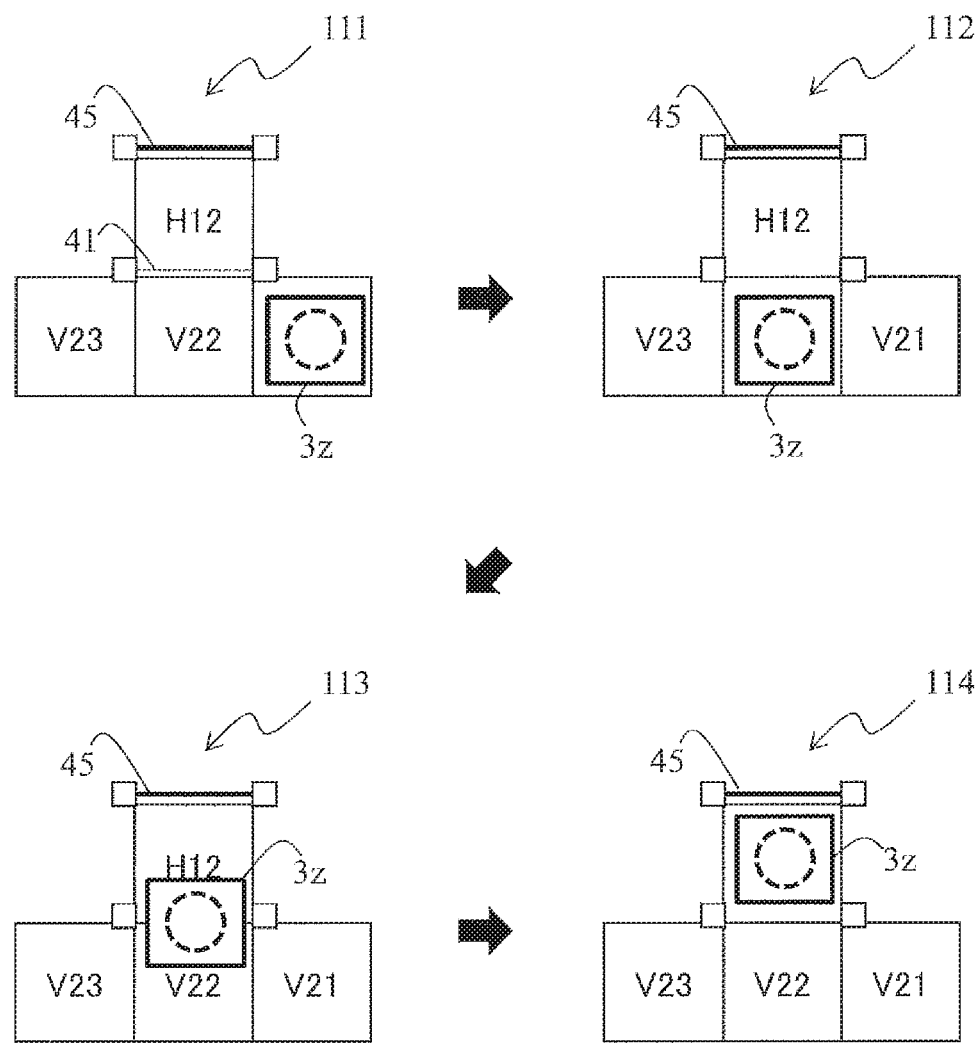
FIG. 6 illustrates work of collecting the rack in the maintenance area according to one embodiment of the present invention.

FIG. 6 illustrates work of collecting the rack 3z in the maintenance area H12. The transport vehicle 3 in FIG. 5 carries no rack 3z, but the transport vehicle 3 in FIG. 6 carries the rack 3z. Thus, in FIG. 6, the transport, vehicle 3 going under the rack 3z and raising the rack 3z is illustrated by a dashed line circle.

First, operations of the transport vehicle 3 from when obtaining the entry permission to when entering the maintenance area (reference signs 111 to 114) are performed as the operations in the reference signs 101 to 104 in FIG. 5. In this case, for the condition for the entry permission, the safety device 2 may add a new condition that the transport vehicle 3 carries the rack 3z (rack presence check).

Thus, the safety device 2 detects whether the transport vehicle 3 carries the rack 3z by emitting the infrared ray from the light source (not illustrated) at the height, which is higher than the height of the transport vehicle 3 but is lower than the height of the top part of the rack 3z, to the transport vehicle 3 and detecting whether the infrared ray is interrupted by the rack 3z using the sensor (not illustrated), for example.

Figure 7:
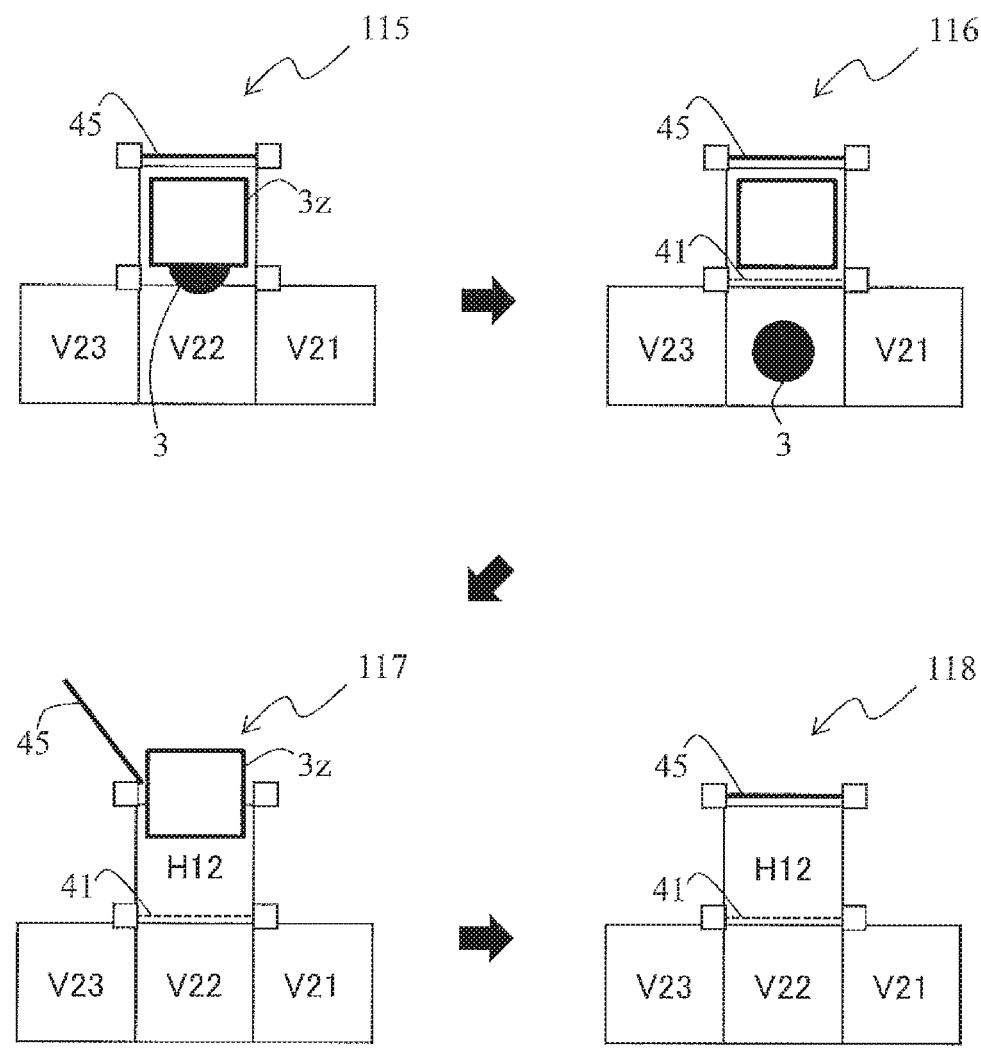
FIG. 7 illustrates the continuation of the collection work in FIG. 6 according to one embodiment of the present invention.

Since the transport vehicle 3 exits from the maintenance area in next processing in FIG. 7, the safety device 2 does not need to transmit the signal for cutting off the power of the motor to the transport vehicle 3.

FIG. 7 illustrates the continuation of the collection work in FIG. 6.

In a reference sign 115, after putting the transported rack 3z in the maintenance area, the transport vehicle 3 that obtains the exit permission from the safety device 2 exits from the maintenance area H12. At this time, the safety device 2 turns off the light curtain 41 until the transport vehicle 3 exits from the maintenance area so as to prevent the transport vehicle 3 that obtains the exit permission from contacting with the light curtain 41.

In a reference sign 116, after the transport vehicle 3 exits from the maintenance area, the safety device 2 turns on the light curtain 41. Thus, the alarm is properly outputted when another transport vehicle 3 accidentally enters the maintenance area.

In a reference sign 117, the safety device 2 opens the electronic door 45 and allows the worker to enter the maintenance area to collect the rack 3z. Also in this case, since the light curtain 41 is turned on, the alarm is properly outputted when the worker accidentally enters the vehicle area from the maintenance area.

In a reference sign 118, after the worker who collected the rack 3z exits from the maintenance area, the safety device 2 closes the electronic door 45 and restores the state to the initial state as the reference sign 111.

The work of collecting the rack 3z in the maintenance area is described above in the order of the reference signs 111, 112, 113, 114, 115, 116, 117 and 118.

Meanwhile, the work of inputting the new rack 3z in the maintenance area is performed in the opposite order of the collection work. That is, the input work is performed in the order of the reference signs 118, 117, 116, 115, 114, 113, 112, and 111. The processing for permitting entry of the transport vehicle 3 is performed in the state in the reference sign 116, and the processing for permitting exit of the transport vehicle 3 is performed in the state in the reference sign 114.

Figure 8:
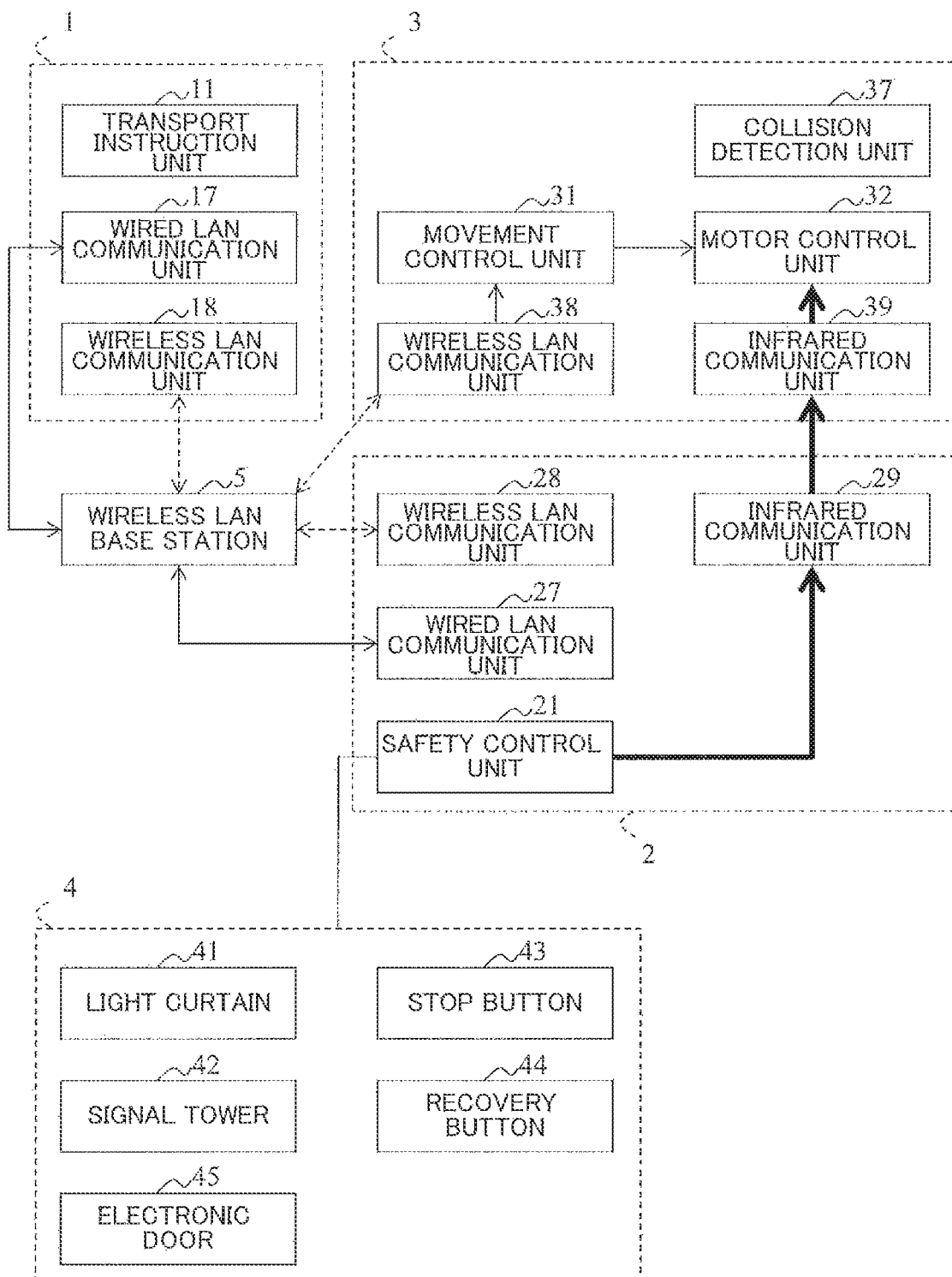
FIG. 8 is a configuration diagram of a transport system according to one embodiment of the present invention.

FIG. 8 is a configuration diagram of a transport system.

The transport system includes the operation device 1, the safety device 2, the transport vehicle 3, and an equipment set for worker 4 connected with each other via a network.

Each of the devices in the transport system is configured as a computer having a central processing unit (CPU), a memory, a hard disk (storage means), and a network interface, and this computer allows the CPU to execute a program read in the memory to operate processing units.

The operation device 1 performs main control such as instructing the travel route of the transport vehicle 3. The operation device 1 determines the travel route by referring to a map of inside the warehouse (inside the vehicle area) such that the transport vehicles 3 do not collide with each other and that each of the transport vehicles 3 arrives as early as possible the maintenance area as a destination. Such an operation device 1 is implemented as a "higher-level device" described in Japanese Patent Application Publication. No. 2015-96993.

In this embodiment, the safety device 2 is a device independent from the operation device 1 that is in charge of safety management around each of maintenance areas distributed in the warehouse. For example, although the operation device 1 instructs (permits) entry to one maintenance area, if the safety device 2 does not permit the entry, the determination and the instruction made by the safety device 2 take priority over that made by the operation device 1 and determine the travel control of the transport vehicle 3. Meanwhile, the job of the safety device 2 is to prevent an accident around the maintenance area managed by this safety device 2; thus, the safety device 2 does not directly specify the destination to make each transport vehicle 3 travel thereto.

In other words, roles are divided between the operation device 1 and the safety device 2, such that the operation device 1 manages traveling of the transport vehicles 3 in the whole vehicle area while the safety device 2 manages the transport vehicles 3 only around the maintenance area. As a result, as the two types of control devices control the transport vehicles 3, the safety is maintained in the different systems and thus the resistance to failure is improved, while the number of the transport vehicles 3 managed by each control device becomes less than the configuration using only the operation device 1. This makes it possible to make faster response to the control instruction.

The independent operations of the safety device 2 and the operation device 1 are not always about making these devices as separated physical housings. Functions of these devices may be configured as respective software processing units (applications, process, and the like), and these software processing units may be configured to be physically stored in the same housing and to connect with each other via interprocess communication.

The operation device 1 has a transport instruction unit 11, a wired LAN communication unit 17, and a wireless LAN communication unit 18.

The safety device 2 has a safety control unit 21, a wired LAN communication unit 27, the wireless LAN communication unit 28, and an infrared communication unit 29.

The transport vehicle 3 has a movement control unit 31, a motor control unit 32, the collision detection unit 37, a wireless LAN communication unit 38, and the infrared communication unit 39.

The equipment set for worker 4 is provided with the light curtain 41, the signal tower 42, the stop button 43, the recovery button 44, and the electronic door 45.

Hereinafter, these constituents are described in details.

Hereinafter, communication means between the devices in the transport system are described.

The wireless LAN communication units 18, 28, and 38 wirelessly communicate with each other according to a radio standard such as wireless fidelity (Wi-Fi, registered mark). The wireless LAN communication enables communication between long distances in the warehouse; thus, the wireless LAN communication is suitable for transmitting a travel command from the operation device 1 to the transport vehicle 3 moving for long distance.

For example, the wireless LAN communication units 18, 28, and 38 are used as a communication means for a signal for urgently stopping the vehicle 3.

Meanwhile, the wired. LAN communication units 17 and 27 include Ethernet (registered mark) and the like, and are used as a fast and stable communication means for connecting the operation device 1 and the safety device 2.

In order to connect the devices scattered in various places in the wide warehouse, it is preferable to install a wireless LAN base station 5 provided with the wireless LAN communication means and the wired LAN communication means and to use this wireless LAN base station 5 as a relay for establishing wireless communication and wired communication between the devices.

In addition, when using the wireless LAN base station 5, the wireless LAN base station 5 can relay (convert with wire or wirelessly) data communication between the wired LAN communication units 17 and 27 and the wireless LAN communication unit 38; thus, the wireless LAN communication units 18 and 28 may be omitted.

The infrared communication units 29 and 39 perform wireless communication using infrared light. The infrared communication has a characteristic that a signal is stably delivered between a short distance, such as several tens of centimeters. With this characteristic, the infrared communication is suitable for reliably notifying the transport vehicle 3 in the maintenance area of an important control signal such as the power-off instruction from the safety device 2. Thus, the infrared communication unit 29 is installed nearby the maintenance area H12, for example.

Since the transport vehicle 3 is recharged by the charging station, if the infrared communication unit 39 is provided in the transport vehicle 3 in advance for the communication with the charging station, this infrared communication unit 39 may be also used for the communication with the infrared communication unit 29. This can reduce the cost of the transport vehicle 3.

For example, the infrared communication units 29 and 39 are used as a communication means for the power-off signal for cutting off the power of the motor in the transport vehicle 3. Note that various methods such as an electric method and a mechanical method can be applied for cutting off the power.

Next, the two types of control signals transmitted to the transport vehicle 3 are described.

First, the transport instruction, unit 11 indicates the travel route to the movement control unit 31 via the wireless LAN communication units 18 and 38, and the movement control unit 31 transmits the travel signal to the motor control unit 32 to allow the transport vehicle 3 to travel along that travel route (thin arrows in FIG. 8).

Next, in order to prevent the accidental operation of the transport vehicle 3 in the maintenance area during the collection work and the like by the worker, the safety device 21 transmits the power-off signal (and a cancel signal thereof) to the motor control unit 32 via the infrared communication units 29 and 39 (thick arrows in FIG. 8). As a result, the motor power in the transport vehicle 3 stops.

At this time, even if the motor control unit 32 receives the travel signal during the power-off, the motor control unit 32 does not transmit (or ignore) that travel signal to the motor; thus, the accidental operation of the stopping transport vehicle 3 in the maintenance area can be prevented. Instead of transmitting the power-off signal to the transport vehicle 3, a power-off switch (not illustrated) of the transport vehicle 3 may be physically operated by the worker using a stick and the like.

Figure 9:
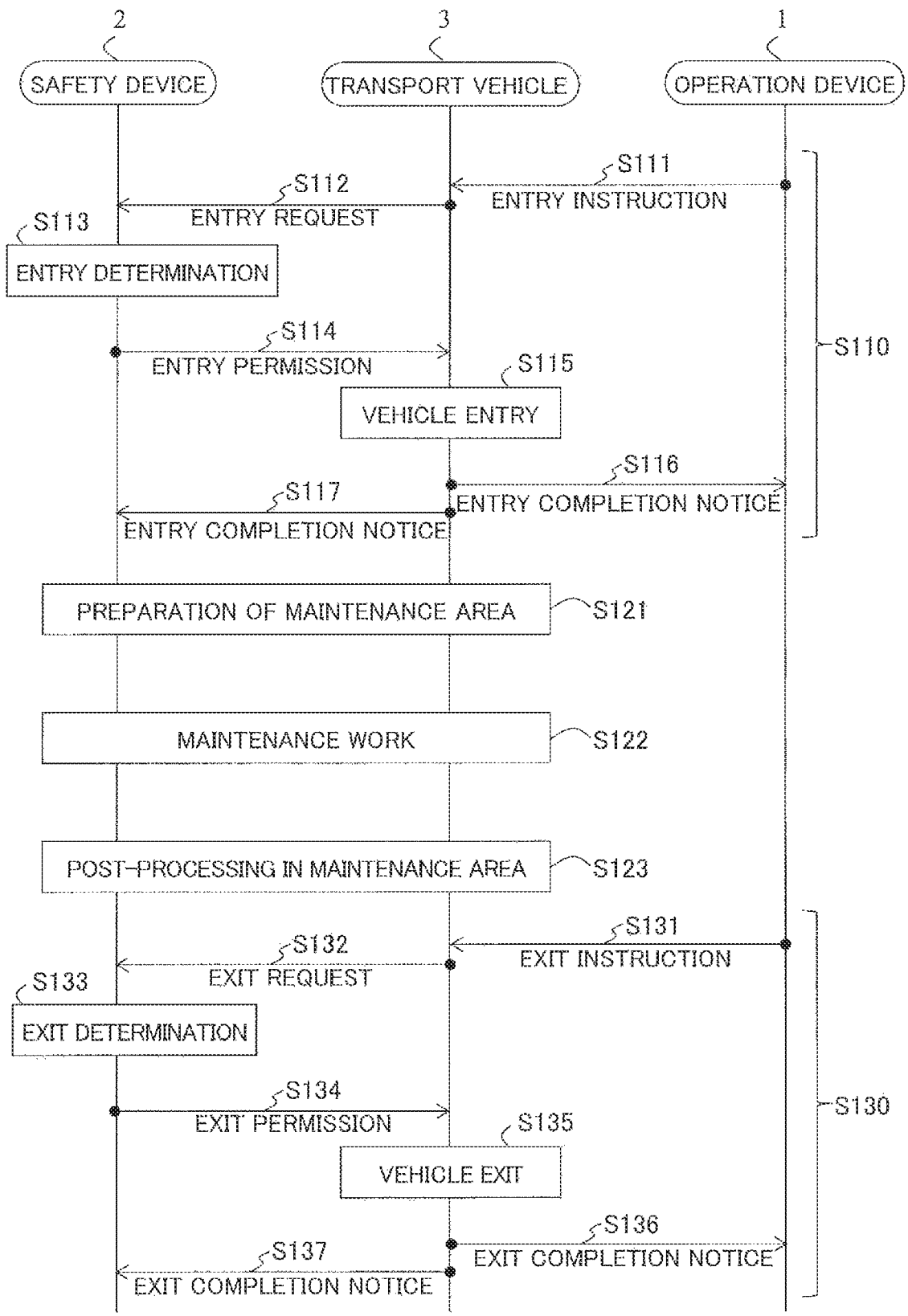
FIG. 9 is a sequence diagram that illustrates entry processing and exit processing in the maintenance area according to one embodiment of the present invention.

FIG. 9 is a sequence diagram that illustrates maintenance processing in the maintenance area.

First, processing for making the transport vehicle 3 enter the maintenance area (S110) is described.

As S111, the transport instruction unit 11 issues a maintenance area entry instruction to the movement control unit 31. As S112, the wireless LAN communication unit 38 transmits a maintenance area entry request to the wireless LAN communication unit 28.

As S113, the safety control unit 21 determines whether to allow the transport vehicle 3 that transmits the entry request in S112 to enter the maintenance area. For example, the safety control unit 21 determines to permit the entry when at least one of the following conditions (or ail conditions if possible) are met.

- There is no transport vehicle 3 other than the transport vehicle 3 that transmits the entry request in the maintenance area.
- The detection signal of the light curtain 41 does not detect an interrupting object such as the worker and the item to be picked.
- The stop button 43 is not pressed for a predetermined period prior to the current time point.
- When the rack 3z in the maintenance area is going to be withdrawn to the vehicle area, the rack presence check is made to see whether the transport vehicle 3 does not carry different rack 3z.
- When the rack 3z transported by the transport vehicle 3 is going to be withdrawn to the worker area by way of the maintenance area, the rack presence check is made to see whether the transport vehicle 3 carries the rack 3z.

As S114, according to the determination result in S113, the wireless LAN communication unit 28 notifies the wireless LAN communication unit 38 of the maintenance area entry permission.

As S115, the movement control unit 31 instructs the motor control unit 32 to move the vehicle to the maintenance area. The wireless LAN communication unit 38 then notifies both the wireless LAN communication unit 18 (S116) and the wireless LAN communication unit 28 (S117) of the arrival of the transport vehicle 3 to the maintenance area.

Next, the safety device 2 prepares for the safe maintenance work by the worker in the maintenance area (S121). Hereinafter, the preparation processing is exemplified.

Making the vehicle presence check to see if the transport vehicle 3 is in the maintenance area.

Instructing the infrared communication unit 39 to cut off the power of the motor in the transport vehicle 3 by the infrared communication unit 29. As a result, even when the wireless LAN communication unit 18 transmits the moving instruction to the wireless LAN communication unit 38, that instruction is ignored during the power-off.

Opening the electronic door 45 to allow the worker to enter the maintenance area (unlocking an electronic lock).

Then, the worker performs the maintenance work (S122) and post-processing (S123). The post-processing is processing performed by the safety device 2 to detect whether the button for notifying of the work completion is pressed by the worker, or, processing performed by the safety device 2 to close the electronic door 45 after the worker exits from the maintenance area.

Then, like the entry processing (S110), the safety device 2 issues an exit permission for the processing for making the transport vehicle 3 exit from the maintenance area (S130). In exit determination in S133, the safety device 2 determines to permit the exit when at least one of the following conditions (or all conditions if possible) are met.

There is no worker in the maintenance area.
There is no product and the like fallen on the floor in the maintenance area.
there is no transport vehicle 3 other than the transport vehicle 3 that transmits the exit request in the vehicle area (such as V22 and V23) as an exit adjacent to the maintenance area.
The stop button 43 is not pressed for a predetermined period prior to the current time point.

Figure 10A:
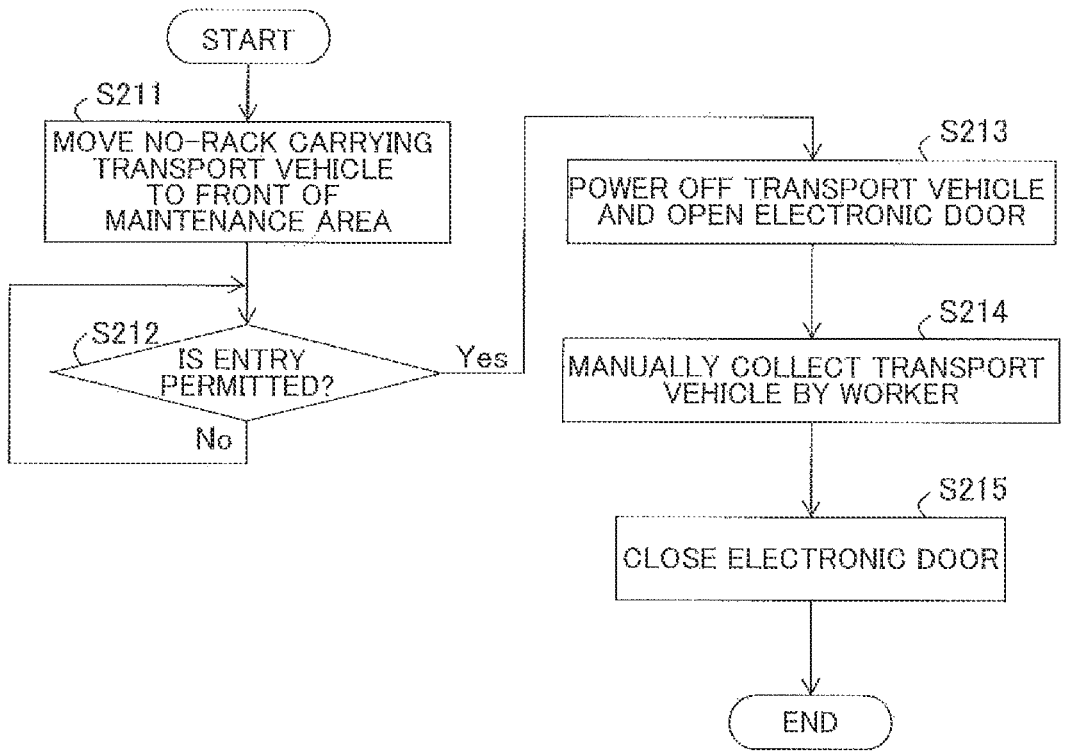
FIG. 10A is a flowchart that illustrates steps of collecting the transport vehicle.

FIG. 10A is a flowchart that illustrates steps of collecting the transport vehicle 3. The steps are described with reference to the states in the reference signs 101 to 106 illustrated in FIG. 5.

As S211, the transport vehicle 3 carrying no rack 3z moves to front of the maintenance area (reference signs 101 and 102). After the safety device 2 issues the entry permission to the transport vehicle 3 (S212, Yes), the safety device 2 turns off the power of the motor in the transport vehicle 3 moved into the maintenance area (reference sign 103) according to the motor deactivation signal (reference sign 104) and opens the electronic door 45 (reference sign 105), as S213.

After the worker finishes manually collecting the transport vehicle 3 (S214) and exits from the maintenance area, the safety device 2 closes the electronic door 45 (S215, reference sign 106).

Figure 10B:
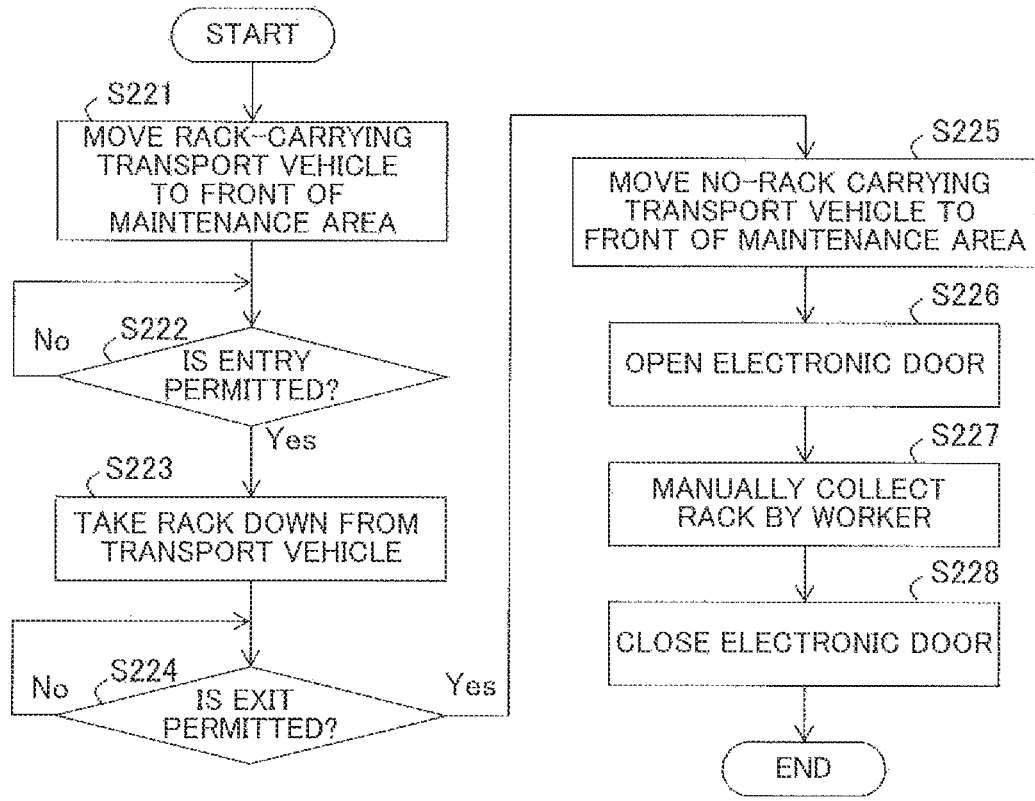
FIG. 10B is a flowchart that illustrates steps of collecting the rack.

FIG. 10B is a flowchart that illustrates steps of collecting the rack 3z. The steps are described with reference to the states in the reference signs 111 to 118 illustrated in FIGS. 6 and 7.

As S221, the transport vehicle 3 carrying the rack 3z moves to front of the maintenance area (reference signs 111 and 112). After the safety device 2 issues the entry permission to the transport vehicle 3 (S222, Yes), the transport vehicle 3 moving into the maintenance area (reference sign 113) stops near the center of the maintenance area (reference sign 114) and takes the transported rack 3z down (S223).

Next, after the safety device 2 issues the exit permission to the transport vehicle 3 (S224, Yes), the transport vehicle 3 carrying no rack 3z moves to front of the maintenance area (S225, reference signs 115 and 116). Accordingly, inside the maintenance area becomes safe in which only the rack 3z is left.

As S226, the safety device 2 opens the electronic door 45 to allow the worker to enter the maintenance area (reference sign 117). Once the worker finishes manually collecting the rack 3z (S227), the safety device 2 closes the electronic door 45 (S228, reference sign 118).

Figure 11A:
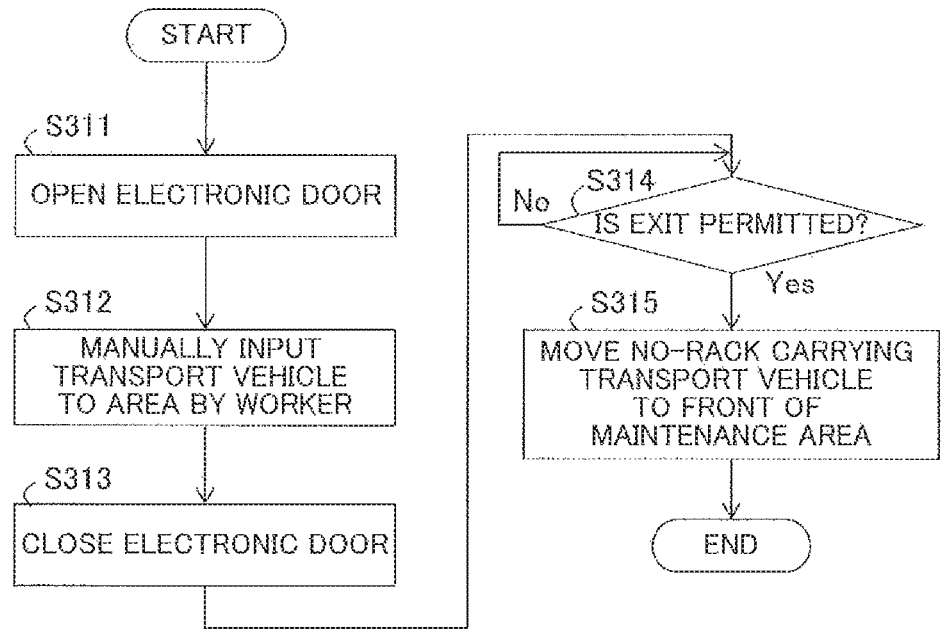
FIG. 11A is a flowchart that illustrates steps of inputting the transport vehicle.

FIG. 11A is a flowchart that illustrates steps of inputting the transport vehicle 3. Like FIG. 10A, the steps are described with reference to the states in reference signs 101 to 106.

As S311, the safety device 2 opens the electronic door 45 that is closed in the initial state (reference sign 106) to allow the worker to enter the maintenance area (reference sign 105). Once the worker finishes manually inputting the transport vehicle 3 (S312), the safety device 2 closes the electronic door 45 after the worker exits (S313, reference sign 104).

Next, the motor in the transport vehicle 3 receives the activation signal for activating the power of the motor in the transport vehicle 3 from the safety device 2 and starts to operate. Then, after the safety device 2 issues the exit permission to the transport vehicle 3 (S314, Yes), the newly inputted transport vehicle 3 moves to front of the maintenance area (S315, reference signs 103 and 102). Then, according to an instruction from the operation device 1, the transport vehicle 3 moves to the next destination (reference sign 101).

Figure 11B:
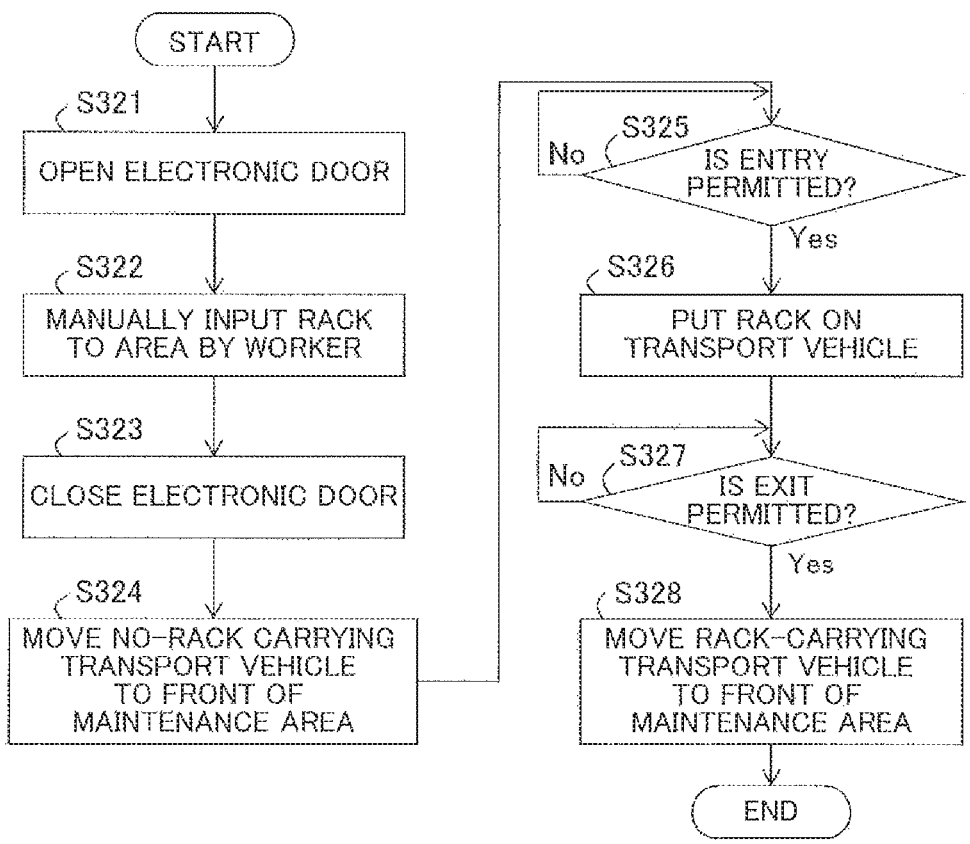
FIG. 11B is a flowchart that illustrates steps of inputting the rack.

FIG. 11B is a flowchart that illustrates steps of inputting the rack 3z. Like FIG. 10B, the steps are described with reference to the states in reference signs 111 to 118.

As S321, the safety device 2 opens the electronic door 45 that is closed in the initial state (reference sign 118) to allow the worker to enter the maintenance area (reference sign 117). Once the worker finishes manually inputting the rack 3z (S322), the safety device closes the electronic door 45 after the worker exits (S323, reference sign 116).

As S324, the transport vehicle 3 carrying no rack 3z under control of the operation device 1 moves to front of the maintenance area. After the safety device 2 issues the entry permission to the transport vehicle 3 (S325, Yes), the transport vehicle 3 moving into the maintenance area (reference sign 115) stops near the center of the maintenance area (reference sign 114) and puts the rack 3z inputted in S322 on the host vehicle to start transporting (S326).

Next, after the safety device 2 issues the exit permission to the transport vehicle 3 (S327, Yes), the transport vehicle carrying the rack 3z moves to front of the maintenance area (S328, reference signs 113 and 112). Then, according to an instruction from the operation device 1, the transport vehicle 3 moves to the next destination (reference sign 111).

In the transport system in the above described embodiment, the safety device 2 in charge of safety management around each of maintenance areas distributed in the warehouse is provided independently from the operation device 1 that manages the general operations of the transport vehicle 3. In addition, in and around the maintenance area, the safety device 2 minutely controls the power of the motor in the transport vehicle 3 and the electronic door 45 so as to prevent the worker and the transport vehicle 3 under control of the operation device 1 from being in the same maintenance area in the same time.

Thus, in the transport system in which the multiple transport vehicles 3 travel on passages in the vehicle area, withdrawal and input of the transport vehicle 3 and the rack 3z can be safely performed in the maintenance area without stopping another transport vehicle 3.

Figure 12A:
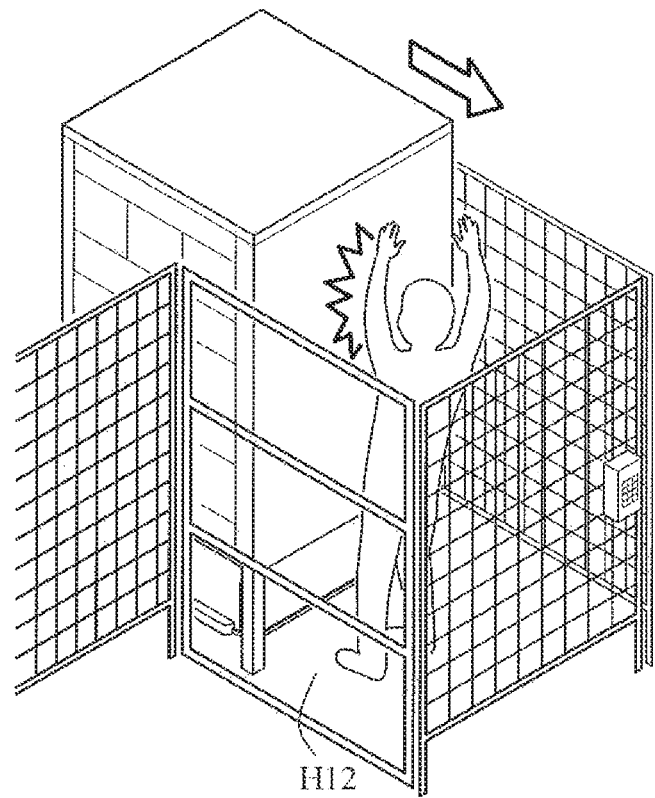
FIG. 12A illustrates the transport vehicle improperly entering the maintenance area.

In addition, even when the operation device 1 instructs the transport vehicle 3 to enter the maintenance area, if the safety device 2 detects the presence of the worker in the maintenance area, the safety device 2 properly determines to not permit the transport vehicle 3 to enter the maintenance area. As a result, a collision accident with the transport vehicle 3 improperly entering the maintenance area H12 as illustrated in FIG. 12A can be prevented.

Figure 12B:
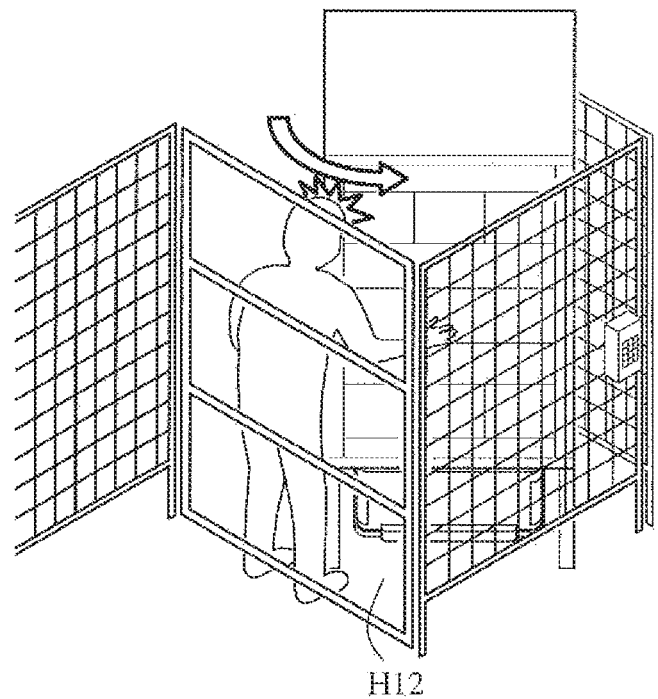
FIG. 12B illustrates the transport vehicle operating improperly in the maintenance area.

Even when the operation device 1 instructs the transport vehicle 3 to operate in the maintenance area, if the safety device 2 detects that the worker is working in the maintenance area, the safety device 2 cuts off the power of the motor in the transport vehicle 3. As a result, a collision accident with the transport vehicle 3 improperly operating and, for example, turning in the maintenance area H12 as illustrated in FIG. 12B can be prevented.

The present invention is not limited to the above embodiment and includes various modifications. For example, the above embodiment is described in details so as to clearly describe the present invention and is not necessarily limited to include the all configurations described above.

A part of a configuration of one embodiment can be replaced with a configuration of another embodiment, or the configuration of the other embodiment can be added to the configuration of one embodiment.

Apart of the configuration of each embodiment may be altered by addition, deletion, or replacement with the configuration of another embodiment. A part or all of the above configuration, function, processing unit, processing means, and the like may be implemented with hardware by being designed as an integrated circuit, for example.

The above configuration, function, and the like may be implemented with software by a processor that interprets and executes a program implementing functions.

Information such as a program, a table, and a file that implement functions can be stored in a recording device such as a memory, a hard disk, and a solid state drive (SSD), or in a recording medium such as an integrated circuit (IC) card, an SD card, and a digital versatile disc (DVD).

A control wire and an information wire thought to be necessary for the descriptions are illustrated, but not all control wires and information wires of the product are necessarily illustrated. In practice, almost all configurations may be thought to be connected with each other.

In addition, the communication means that connects the devices is not limited to the wireless LAN, and may be changed to the wired LAN or another communication means.

REFERENCE SIGNS LIST 1 operation device
2 safety device
3 transport vehicle
3z rack
4 equipment set for worker
5 wireless LAN base station
11 transport instruction unit
17 wired LAN communication unit
18 wireless LAN communication unit
21 safety control unit
27 wired LAN communication unit
28 wireless LAN communication unit
29 infrared communication unit
31 movement control unit
32 motor control unit
37 collision detection unit
38 wireless LAN communication unit
39 infrared communication unit
40 picking gate
41 light curtain
42 signal tower
43 stop button
44 recovery button
45 electronic door

The invention claimed is:

1. A transport system in which a transport vehicle moves a transport target within a vehicle area in a warehouse provided with the vehicle area where the transport vehicle travels, a maintenance area where a worker performs maintenance work, and a worker area where the worker moves, the transport system comprising:
a light curtain that limits movement of the transport vehicle between the vehicle area and the maintenance area; and
a door that limits movement of the worker to the maintenance area, wherein
after the transport target moves to the maintenance area, the door is unlocked while the light curtain limits the movement of the transport vehicle.

2. The transport system according to claim 1, wherein the light curtain is turned off in an operation to input the transport target transported by the transport vehicle to the maintenance area.

3. The transport system according to claim 1, wherein the light curtain limits the movement of the transport vehicle after the transport vehicle moves to the vehicle area after inputting the transport target transported by the transport vehicle to the maintenance area.

4. The transport system according to claim 1, wherein the maintenance work includes input of the transport vehicle, withdrawal of the transport vehicle, input of a rack, withdrawal of the rack, and replacement of an item in the rack.

5. A transport system in which a transport vehicle moves a transport target within a vehicle area in a warehouse provided with the vehicle area where the transport vehicle travels, a maintenance area where a worker performs maintenance work, and a worker area where the worker moves, the transport system comprising:
a light curtain that limits movement of the transport vehicle between the vehicle area and the maintenance area; and
a door that limits movement of the transport vehicle to the worker area, wherein
after the transport vehicle moves to the maintenance area, the door is unlocked to allow the transport vehicle to move to the worker area while the light curtain limits the movement of the transport vehicle.

6. The transport system according to claim 5, wherein during the movement of the transport vehicle to the worker area, the transport vehicle moves according to an instruction from the worker.

7. The transport system according to claim 5, wherein the maintenance work includes input of the transport vehicle, withdrawal of the transport vehicle, input of a rack, withdrawal of the rack, and replacement of an item in the rack.

8. A transport system in which a transport vehicle moves a transport target within a vehicle area in a warehouse provided with the vehicle area where the transport vehicle travels, a maintenance area where a worker performs maintenance work, and a worker area where the worker moves, the transport system comprising:
- a light curtain that limits movement of the transport vehicle between the vehicle area and the maintenance area; and
- a door that limits movement of the transport target to the maintenance area, wherein
  the door is unlocked to allow the transport target to move from the worker area to the maintenance area while the light curtain limits the movement of the transport vehicle.

9. The transport system according to claim 8, wherein the light curtain is turned off after the door is closed, and thereafter the transport vehicle moves to the maintenance area and the transport vehicle moves the transport target into the vehicle area.

10. The transport system according to claim 8, wherein the maintenance work includes input of the transport vehicle, withdrawal of the transport vehicle, input of a rack, withdrawal of the rack, and replacement of an item in the rack.

* * * * *